United States Patent [19]

Ida et al.

[11] Patent Number: 4,503,596
[45] Date of Patent: Mar. 12, 1985

[54] TRANSFER TYPE WORKING SYSTEM

[75] Inventors: Jinsei Ida, Sayama; Tsutomu Fujita, Kawagoe; Kenzaburo Matsuo, Kawagoe; Fumio Higuchi, Kawagoe; Mitsuo Tamura, Kawagoe, all of Japan

[73] Assignee: Honda Giken Kogyo Kabushiki Kaisha, Tokyo, Japan

[21] Appl. No.: 387,211

[22] Filed: Jun. 10, 1982

[30] Foreign Application Priority Data

Jun. 12, 1981 [JP] Japan .................................. 56-89510

[51] Int. Cl.³ ...................... B23Q 3/157; B23Q 41/02
[52] U.S. Cl. ...................................... 29/568; 29/33 P; 29/563; 198/341; 198/467
[58] Field of Search .................. 29/568, 33 P, 563; 408/40; 198/340, 341, 465, 467

[56] References Cited

U.S. PATENT DOCUMENTS 3,286,595 11/1966 Wollenhaupt ..................... 29/568 X
3,530,571 9/1970 Perry ................................ 29/563 X
3,543,392 12/1970 Perry et al. ......................... 29/563
3,781,974 1/1974 Hölzl et al. ......................... 29/568
4,110,898 9/1978 Yamaoka et al. .................... 29/568

Primary Examiner—Z. R. Bilinsky
Attorney, Agent, or Firm—Armstrong, Nikaido, Marmelstein & Kubovcik

[57] ABSTRACT

A transfer type working system including a transfer line for intermittently conveying workpieces thereon. The transfer line has plural stages of working stations disposed in front and rear relationship. Each of the working stations has at least one machine tool for working on one of the workpieces on that station. Each of the machine tools comprises a ganghead replaceable machine tool having plural gangheads arranged to be selectively operable. Each of the working stations has, at a preceding position thereof, a front sensor for reading the kind of workpiece on a preceding position so that, in the course of conveying any of the workpieces to each of the working stations, one of the gangheads that corresponds to the kind of workpiece read is previously selected for operation by a signal obtained at the front sensor.

3 Claims, 4 Drawing Figures

TRANSFER TYPE WORKING SYSTEM

BACKGROUND OF THE INVENTION

1. Field of the Invention

The present invention relates to a transfer type working system of the type that a transfer line for intermittently conveying workpieces is provided thereon with plural stages of working stations disposed in front and rear relationship so that each workpiece may be worked upon by plural working processes by machine tools provided at the respective working stations.

2. Description of the Prior Art

It has been usual hitherto with this kind of system that the machine tool provided at each of the working stations is a machine tool of a single function providing only a single working process out of the plural working processes of the entire line. Consequently, replacement of the machine tool with a different one or the provision of an additional transfer line becomes necessary when any of the working processes is changed or the kind of workpiece is changed.

In addition, in usual systems, when the machine tool is to be replaced, the manufacturing operation is stopped. When an additional transfer line is to be provided, the floor space of a factory is largely occupied thereby. Thus both of the previous cases involve inconvenience or disadvantages that result in a lowering of production efficiency.

Especially recently, it has been desired that a working system not only have a lot production form in which workpieces of a single kind are processed, but also have various production forms of processing the workpieces such as a multi-kind random production form in which plural kinds of workpieces are conveyed at random on the same transfer line, a multi-process lot production form in which workpieces requiring plural working processes are processed for a short time by plural machine tools, each having multi-working processes and also a multi-kind multi-process random production form of the type that the foregoing two forms are combined together. However, it is hardly possible for the conventional system to meet such desires by the replacement of machine tools or the additional provision of another transfer line.

OBJECT AND SUMMARY OF THE INVENTION

This invention has for its object to provide a system which is adaptable to any of those various production forms freely without increasing the transfer line or the like.

The present invention comprises a transfer system comprising a transfer line for intermittently conveying workpieces thereon having plural stages of working stations disposed in front and rear relationship, each of the working stations having at least one machine tool for working upon one of the workpieces on that station. Each of the machine tools comprises a ganghead replaceable machine tool having plural gangheads arranged to be selectively operable and each of the working stations has, at a preceding position thereof, a front sensor for reading the kind of workpiece on a preceding position so that, in the course of conveying any of the workpieces to each of the working stations, one of the gangheads that corresponds to the kind of workpiece read is previously selected for operation by a signal obtained at the front sensor.

A second feature of this invention is characterized in that, in the foregoing system, each of the working stations has thereon a rear sensor for reading the kind of workpiece on that working station so that, after the correspondence between the kind of the workpiece read which has conveyed to that particular working station and the previously selected ganghead is confirmed to be correct, the selected ganghead may be brought into a working operation and the rear sensor is used also for the front sensor for the next stage working station.

A third feature of this invention is characterized in that, in the foregoing system, the transfer line is provided at each interval, between every adjacent working station, an orientation changing station so that the workpiece on the orientation changing station may be given an orientation change during the working upon the workpiece at each working station.

A fourth feature of this invention is characterized in that, in the foregoing system, a magazine for gangheads is provided outside the machine tool arrangement region through a runway for a conveying carrier.

BRIEF DESCRIPTION OF THE DRAWINGS

The above and other objects and the attendant advantages of the present invention will become readily apparent by reference to the following detailed description, when considered in conjunction with the accompanying drawings, wherein.

DETAILED DESCRIPTION OF PREFERRED EMBODIMENT

Figure 1:
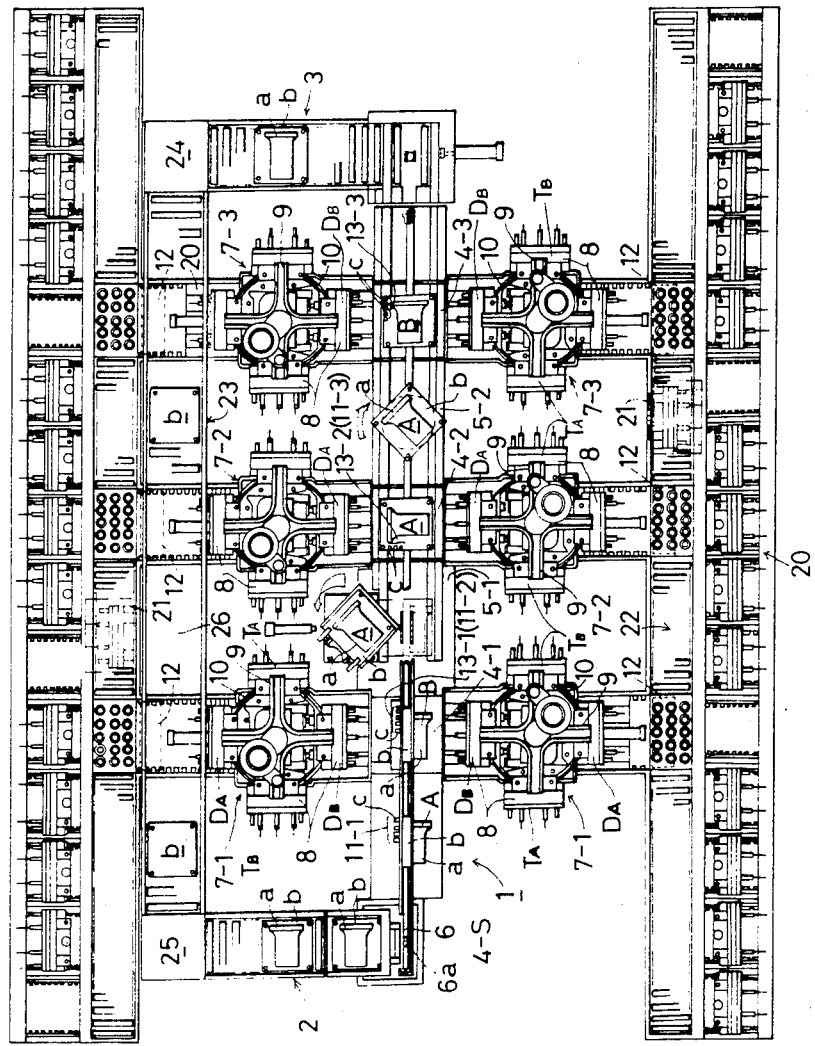
FIG. 1 shows a top plan view of one embodiment of the present invention.
Figure 2:
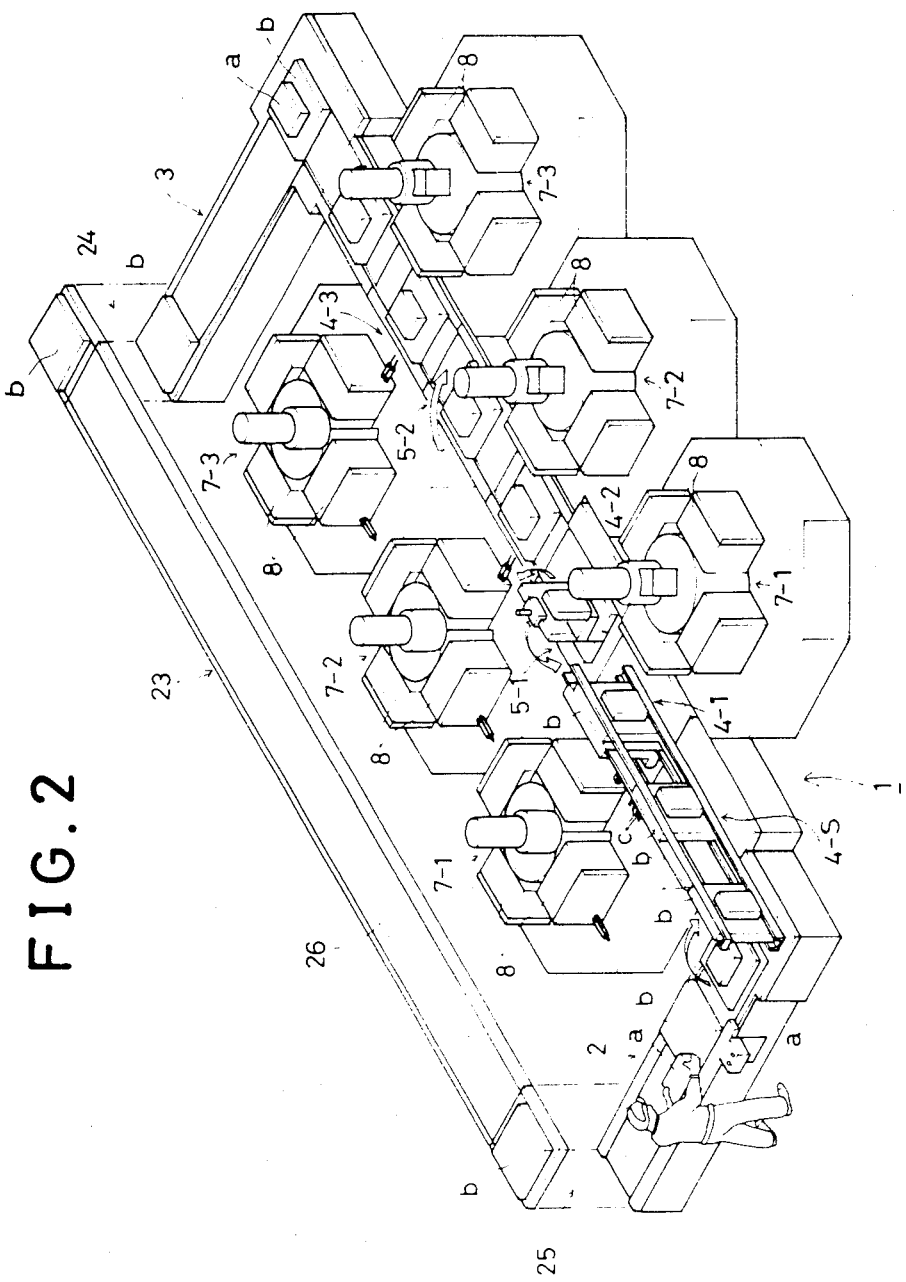
FIG. 2 is a perspective view thereof.

A first embodiment of this invention will now be explained with reference to the accompanying drawings:

Referring to the drawings, a transfer line 1 connects between a front end loading station 2 at which a workpiece a is attached to a pallet b and a rear end unloading station 3 at which the work a is detached from the pallet b. Three stages of 1st to 3rd working stations 4-1, 4-2, 4-3 are provided on the transfer line 1 arranged at regular intervals in front and rear relationship. Additionally, in the middle of each of the respective intervals between every adjacent one of the foregoing three stations 4-1, 4-2, 4-3, 1st and 2nd orientation changing stations 5-1, 5-2 are provided. Thus, the pallet b with the workpiece a attached thereto at the loading station 1 is transferred step-by-step, to the 1st working station 4-1, the 1st orientation changing station 5-1, the 2nd working station 4-2, the 2nd orientation changing station 5-2 and the 3rd working station 4-3, in order, by operation of a transfer bar 6 having engaging claws 6a which are brought in engagement with respective engaging openings (not illustrated) on the pallet b. At the 1st working station 4-1, the workpiece a is worked upon in a desired manner, for example, on both upper and lower surfaces thereof by 1st machine tools 7-1, 7-1 disposed on both lateral sides of the station 4-1, with the pallet b being set on edge in its upright orientation. Next, at the first orientation changing station 5-1, the pallet b is brought down into its horizontal orientation and is turned 90° and then, at the 2nd working station 4-2, the workpiece a is worked upon, for example, on both front and rear surfaces thereof by 2nd machine tools 7-2, 7-2 disposed on both lateral sides of the station 4-2. Thereafter, the pallet b is turned 90° at the 2nd orientation changing station 5-2 and, at the 3rd working station 4-3, the work a is worked upon, for example, on right and left surfaces thereof by 3rd machine tools 7-3, 7-3 disposed on both lateral sides of the station 4-3. In this case, each of the machine tools 7-1, 7-2, 7-3 on each side comprises a ganghead replaceable type machine tool having four gangheads 8 arranged to be operable selectively. The same is not especially different in construction from that of Japanese patent application Sho No. 52-30717 previously proposed by the applicants' company of the present application and is so constructed that the respective gangheads are rotated along on an annular supporting rail 10 by turning of an index table 9 which is provided thereabove and is in pin-engagement therewith. By a selection operation of the table, any desired ganghead 8 may be moved to the inside selection position word the work. Thereafter, the selected ganghead 8 may be advanced inwards to work on a workpiece.

In the illustrated example, in order that the system may conform with a 2 kind - 12 processes random production form in which workpieces a of two different kinds A,B are conveyed at random along on the transfer line 1 and at each of the working stations 4-1, 4-2, 4-3, the workpiece a is applied with two working processes; that is, a drilling and a tapping upon each of the opposite surfaces thereof. The four gangheads 8 of each of the machine tools 7-1, 7-2, 7-3 on each side are composed of two types of drill heads DA, DB and two types of tapping heads TA, TB for processing the respective two kinds A, B of workpieces a.

Additionally, the respective working stations 4-1, 4-2, 4-3 are provided at their respective preceding positions with respective front sensors 11-1, 11-2,11-3 for reading the kind of the workpiece a at each preceding position so that, in the source of conveying the workpiece a to each of the working stations 4-1, 4-2, 4-3, either one DA or DB of the gangheads 8 corresponding to the read workpiece a may be previously selected for the operation position by a signal obtained at each of the front sensors 11-1, 11-2, 11-3.

More in detail, the different kinds of the workpieces a are made, for instance, by a combination of existence and nonexistence of four discrimination pins provided in a cavity portion (not illustrated) of the pallet b. The existence or nonexistence of these pins is detected by a discrimination sensor having four detecting elements c such as contact type detectors, optical type detectors or the like so as to discriminate the kinds of the workpiece a one from another.

It is possible, of course, that the discrimination sensor may be a reading means which reads the shape of the work a.

Figure 3:
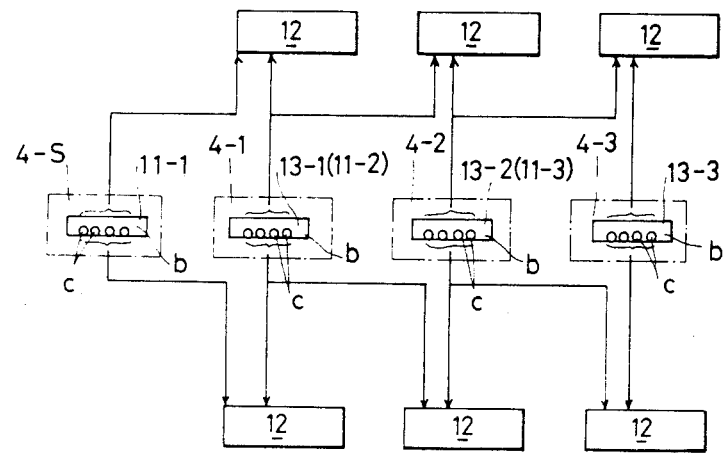
FIG. 3 is a block diagram showing a control means for the present invention.

As shown clearly in FIGS. 1 and 3, those discrimination sensors are disposed, at the preceding position of each of the working stations 4-1, 4-2, 4-3 so as to serve as the front sensors 11-1, 11-2, 11-3. A reading signal obtained at each of the respective front sensors 11-1, 11-2, 11-3 is inputted to and memorized in each of control means 12 for each of the respective machine tools 7-1, 7-2, 7-3 provided at the respective working stations 4-1, 4-2, 4-3. Thereby while the read workpiece a discriminated is also being conveyed to each of the respective working stations 4-1, 4-2, 4-3, the selection operation of the ganghead 8 corresponding to that type of workpiece a may be brought about in accordance with a programming of each of the respective control means 12.

Additionally, in the illustrated example, the respective working stations 4-1, 4-2, 4-3 are also provided with the foregoing type of discrimination sensors to be used as their respective rear sensors 13-1, 13-2, 13-3 so that, after the correspondence between the read workpiece a, which is actually conveyed in each station, and the ganghead 8 previously selected is confirmed to be correct by the control means 12, the selected ganghead 8 may be given a working operation. In this case, the rear sensors 13-1, 13-2 for the 1st and 2nd working stations 4-1, 4-2 are used also for the foregoing front sensors 11-2, 11-3 for their next rear stage 2nd and 3rd working stations 4-2, 4-3 so that the apparatus may be simplified. An additional discrimination station 4-8 exclusively used for the 1st working station 4-1 is provided at the preceding portion of the station 4-1, and the front sensor 11-1 is provided thereon.

Figure 4:
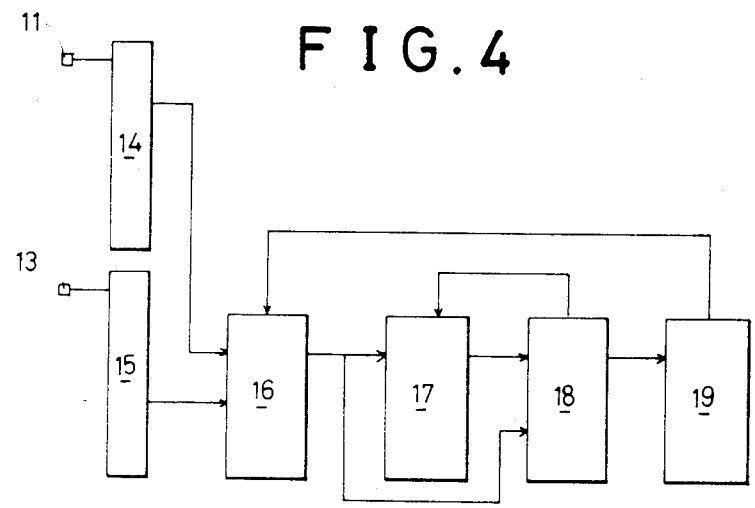
FIG. 4 is a block diagram showing a control means for each machine tool thereof.

The control circuit 12 comprises, as shown in FIG. 4, for instance, 1st and 2nd discrimination circuits 14,15 for being inputted with respective reading signals from the front and rear sensors 11,13, a selection instruction circuit 16 for generating an instruction signal by reading either signal of the two discrimination circuits 14,15, a ganghead selection circuit 17 for bringing a selection operation of the ganghead according to the instruction signal, a confirmation circuit 18 for judging the propriety of the selection of the ganghead 8, and a ganghead operation control circuit 19 for starting the working operation of the ganghead 8 by a confirmation signal obtained at the confirmation circuit 18. Thus the control circuit 12 operates in such a manner as described below.

Namely, by a working completion signal given from the control circuit 19 to the selection instruction circuit 16, in conjunction with the completion of working upon the workpiece a, the selection instruction circuit 16 generates an instruction signal by reading the kind A,B of the workpiece a which is being conveyed to the working station, from the 1st discrimination circuit 14 inputted with the reading signal of the front sensor 11. Then a selection operation of the ganghead 8 corresponding to that read workpiece a is effected by the ganghead selection circuit 17. When the workpiece a has been then conveyed into the working station, the selection instruction circuit 16 reads the kind A,B of that workpiece a which actually is now positioned on that station, from the 2nd discrimination circuit 15 inputted with a reading signal of the rear sensor 13. At the confirmation circuit 18, it is confirmed that the correspondence between the workpiece a and the ganghead 8 previously selected by the foregoing selection operation is correct or not. If the selection of the ganghead 8 is confirmed to be correct, a working operation of the ganghead 8 is started by the ganghead operation control circuit 19. If the same is confirmed not to be correct, a selection of the ganghead 8 is carried out again and thereafter the working operation is started.

The ganghead 8 previously selected in the course of conveying the workpiece a into the working station is the drill head DA or DB. After the completion of such a drill working process, the selection instruction signal for selecting the tapping head TA, TB is generated at the selection instruction circuit 16. Thereby the selection of the tapping head and the subsequent tapping working process by that selected tapping head TA or TB is carried out. As a result of that completion of the tapping working, the working completion signal is generated at the ganghead operation control circuit 19. This signal is inputted to the selection instruction circuit 16 and thus the foregoing operations are repeated.

Referring to the drawings, a magazine 20 for stocking gangheads is provided outside the arrangement section of the 1st to 3rd machine tools 7-1, 7-2, 7-3 through a runway 22 for a conveying carrier 21 interposed therebetween. Consequently, in a case where the workpieces a to be conveyed along on the transfer line 1 are to be changed into one of a different kind, the replacement of the ganghead 8 with a new one can be made rapidly. In the illustrated example, the magazine 20 is formed in a continuous straight one in common to all of the respective machine tools 7-1, 7-2, 7-3 so that any of the gangheads 8 stored in the magazine 20 can be replaced with any of the gangheads of any desired one of the machine tools 7-1, 7-2, 7-3. A pallet return line 23 is provided for returning the pallet b, which has been detached from the workpiece a at the unloading station 3 to the unloading station 2. The line 23 comprises an elevating means 24 for conveying the pallet b upwardly and an elevating means 25 for conveying the same downwardly. These means 24, 25 are disposed on the respective end sides of the two stations 3,2. A return conveyor 26 is provided for connecting between the two means 24, 25. Thus an upper space over the arrangement section of the machine tools 7-1, 7-2, 7-3 can be effectively utilized.

Next, the whole operation of the apparatus of this invention will be explained with reference to FIG. 1 as follows:

The same Figure shows such a transfer condition that the discrimination station 4-S is supplied with a workpiece a of A kind, the 1st working station 4-1 is supplied with a workpiece a of B kind, the 1st orientation changing station 5-1, the 2nd working station 4-2 and the 2nd orientation changing station 5-2 are supplied with respective workpieces a of A kind and the 3rd working station 4-3 is supplied with a workpiece a of B kind. At the 1st and 3rd machine tools 7-1, 7-3, the respective gangheads 8,8 of DB, DB corresponding to the workpieces a of B kind on the 1st and 3rd working stations 4-1, 4-3 have been selected for operation. At the 2nd machine tool 7-2, the ganghead 8 of DA corresponding to a workpiece a of A kind on the 2nd working station 4-2 has been selected for operation. The drill working processes by these gangheads 8 are simultaneously started at the respective working stations 4-1, 4-2, 4-3 and, after the completion of the drill working processes, the gangheads 8,8 of TB, TB are selected for operation at the 1st and 3rd machine tools 7-1, 7-3. The ganghead 8 of TA is selected for operation at the 2nd machine tool 7-2 and the tapping working processes by them are carried out.

During those working operations, the orientations of the workpieces a of A kind at the 1st and 2nd orientation changing stations 5-1, 5-2 are changed into respective predetermined ones. After the completion of the working operations at the respective working stations 4-1, 4-2, 4-3 and the completion of the orientation changes at the respective orientation changing stations 5-1, 5-2 are confirmed, all of the workpieces a are transferred by one step by the operation of the transfer bar 6.

If the workpiece a of A kind is conveyed into the 1st working station 4-1 from the discrimination station 4-S and during this time it is read by the reading signal of the front sensor 11-1 provided on the discrimination station 4-S that the workpiece a is of A kind, then the selection operation of the ganghead 8 of DA corresponding to the signal is brought about simultaneously with the above conveying operation of the workpiece a into the 1st working station 4-1.

In the meanwhile, the respective workpieces a of A kind are transferred to the 2nd and 3rd working stations 4-2, 4-3 from the 1st and 2nd orientation changing stations 5-1, 5-2.

In this case, the workpiece a is transferred by two steps from the 1st working station 4-1 to the 2nd working station 4-2 through the 1st orientation changing station 5-1. Accordingly, when the rear sensor 13-1 provided on the 1st working station 4-1 is used also for the front sensor 11-2 for the 2nd working station 4-2, the fact that the workpiece a which is being conveyed into the 2nd working station 4-2 is of A kind is read by the signal which was generated from the sensor 13-1 before one step. In this manner, the selection operation of the ganghead 8 of DA is accomplished.

Similarly, the fact that the workpiece a which is being carried into the 3rd working station 4-3 is of A kind is read in advance and a selection operation of the ganghead 8 of DA is accomplished simultaneously with the conveying operation of the workpiece a into the station 4-3.

When the workpieces a have been introduced into the respective working stations 4-1, 4-2, 4-3, the introduced workpieces a are read by the respective rear sensors 13-1, 13-2, 13-3 on the respective working stations 4-1, 4-2, 4-3. The confirmation of the correspondence of each workpiece a to each selected ganghead is carried out at each working station. Thereafter, the working operation by the selected ganghead is started again similarly as above at each station. Thus, the foregoing whole operations are repeated.

The illustrated apparatus has been explained about working upon the workpieces by using the 2 kind - 12 process random production form but it is also possible to work upon the workpieces not only by using the same, but also by using such various forms as a 2 kind - 12 process lot production form, a 1 kind - 24 process lot production form, a 4 kind - 6 process random or lot production form or the like.

Thus, according to this invention, the machine tool provided for each working station comprises a ganghead replaceable type machine tool having plural gangheads arranged to be selectively operable so that the apparatus can comply with any change in kinds of workpieces or manners of working processes thereof, etc. without replacing of any of the machine tools or increasing of the size of the transfer line. It becomes possible for this invention to work upon workpieces by using any of the various kinds of production forms. Additionally, it is so arranged that a front sensor provided at the preceding position of each working station, and thereby the kind of the workpiece which is to be conveyed into each working station, may be previously read. Thus in the course of conveying of the workpiece a into that station, a ganghead corresponding to that workpiece a is selected so that a time loss for selection of the ganghead can be omitted and the production efficiency can be extremely improved.

According to the second feature of this invention, a rear sensor is provided on each working station and thereby the ganghead may be brought into a working operation after checking the propriety of the correspondence between the workpiece a actually introduced in the station and the ganghead previously selected so that it can be assured that no wrong working operation can be made. Additionally, the rear sensor is used also for the front sensor for the rear stage working station so that the apparatus can be simplified in construction.

According to the third feature of this invention, an orientation changing station is provided in each space between the respective adjacent working stations for giving a desired orientation change to the workpiece so that respective working operations upon mutually different surfaces of the workpieces at the respective working stations can be carried out at each station and working upon multi-surface of the workpiece becomes possible. Additionally, since the orientation change of the work is carried out during the working upon the workpieces at the respective working stations, there can be eliminated such lowering in production efficiency that is caused by a time loss for the orientation change.

According to the fourth feature of this invention, a magazine for gangheads is provided outside the arrangement section of the machine tools with a runway for a conveying carrier interposed therebetween so that, at the time of replacing of gangheads in order to comply with working upon a workpiece of a different kind, the replacing operation can be carried out rapidly between any of the machine tools and their adjacent magazines.

It is readily apparent that the above-described transfer type working system meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A transfer type working system comprising a transfer line for intermittently conveying workpieces thereon having plural stages of working stations disposed in front and rear relationship, each of the working stations having at least one machine tool for working upon one of the workpieces on that station, each of the machine tools comprising a ganghead replaceable machine tool having plural gangheads arranged to be selectively operable and each of the working stations having at a preceding position thereof with a front sensor means for reading the kind of workpiece on a preceding position so that, in the course of conveying any of the workpieces to each of the working stations, one of the gangheads that corresponds to the kind of the workpiece read is previously selected for operation by a signal at the front sensor means, a rear sensor means for reading the kind of workpiece which has been conveyed to that particular working station so that, after the correspondence between the kind of the workpiece which has been conveyed to the particular working station and the previously selected ganghead is confirmed to be correct, the selected ganghead may be brought into a working operation, the rear sensor means being used also for the front sensor means for the next stage working station, and control means connected to the machine tool and operatively coupled to the front and the rear sensor means for selecting the appropriate ganghead, for confirming the same to be correct, and for controlling the operation of the selected ganghead.

2. A system as claimed in claim 1 wherein the transfer line further includes, at each interval between every adjacent working station, an orientation changing station so that the workpiece at the orientation changing station may be given an orientation change during the working upon the workpieces at each working station.

3. A system as claimed in claim 1 further comprising a magazine for gangheads positioned adjacent said machine tools, a runway disposed between said magazine and said tools and means for conveying gangheads on said runway.

* * * * *